US009083616B2

(12) United States Patent
Yamamoto

(10) Patent No.: US 9,083,616 B2
(45) Date of Patent: Jul. 14, 2015

(54) PACKET COMMUNICATION METHOD AND EQUIPMENT THEREFOR

(75) Inventor: Yuzo Yamamoto, Naka-gun (JP)

(73) Assignee: JAPAN ATOMIC ENERGY AGENCY, Naka-gun (JP)

( * ) Notice: Subject to any disclaimer, the term of this patent is extended or adjusted under 35 U.S.C. 154(b) by 70 days.

(21) Appl. No.: 13/609,983

(22) Filed: Sep. 11, 2012

(65) Prior Publication Data
US 2013/0107708 A1 May 2, 2013

(30) Foreign Application Priority Data

Oct. 26, 2011 (JP) .................................. 2011-234702

(51) Int. Cl.
| H04L 1/00 | (2006.01) |
| H04L 12/26 | (2006.01) |
| H04L 29/06 | (2006.01) |
| H04L 1/06 | (2006.01) |

(52) U.S. Cl.
CPC .............. *H04L 43/0829* (2013.01); *H04L 1/06* (2013.01); *H04L 29/06* (2013.01); *H04L 69/14* (2013.01)

(58) Field of Classification Search
CPC ......... H04L 1/06; H04L 1/1614; H04L 29/06; H04L 1/1809; H04L 69/14
See application file for complete search history.

(56) References Cited

U.S. PATENT DOCUMENTS

| 7,113,521 | B2* | 9/2006 | Miller et al. .................. 370/474 |
| 8,400,925 | B2* | 3/2013 | Wurm et al. .................. 370/236 |
| 2009/0319847 | A1* | 12/2009 | Carpio et al. ................. 714/748 |
| 2010/0246602 | A1* | 9/2010 | Barreto et al. ................ 370/466 |
| 2010/0297962 | A1* | 11/2010 | Rofougaran .................... 455/88 |
| 2011/0314351 | A1* | 12/2011 | Tada et al. .................... 714/751 |
| 2012/0311173 | A1* | 12/2012 | Agarwal et al. ............... 709/231 |
| 2013/0155991 | A1* | 6/2013 | Kazmi et al. ................. 370/329 |

FOREIGN PATENT DOCUMENTS

JP          2004-297265 A          10/2004

* cited by examiner

*Primary Examiner* — Edan Orgad
*Assistant Examiner* — Rebecca Song
(74) *Attorney, Agent, or Firm* — Westerman, Hattori, Daniels & Adrian, LLP

(57) ABSTRACT

To reduce or prevent effect of deterioration of communication quality caused from packet loss in a packet communication, a plurality of Packet Assembly Disassembly devices (PDAs) are installed at a first terminal equipment and at a second terminal equipment, and a packet communication is performed using one PDA in such plurality of PDAs. If the packet loss of received data in such packet communication is detected exceeding the predetermined value, a request is sent using another PDA to the first terminal equipment for transmitting the same data that above-stated one PDA is handling and the data transmitted at the request is received. On reception of the data at the request, sizes of the packet loss rate of received data with above-stated one PDA and of the packet loss rate of received data with above-stated another PDA are compared and the packet communication is continued selecting a system of which packet loss rate is smaller.

6 Claims, 3 Drawing Sheets

PACKET COMMUNICATION METHOD AND EQUIPMENT THEREFOR

This application is drafted quoting the entire contents of the specification, drawings, and the abstract included in Japanese Patent Application No. 2011-234702 filed on Oct. 26, 2011.

TECHNICAL FIELD

The present invention relates to a packet communication method that works on network circuits and equipment therefor.

BACKGROUND ART

Internet Protocol (IP) telephone systems, IP video conference systems, or other similar systems, in which sound data and picture data are transmitted (in a form of packet communication) using network circuits, have adopted the User Datagram Protocol (UDP) communication, because such systems need the securing of continuous communication band.

The UDP communication however will lose excess packets if communication information is inputted beyond the transmission capacity of transmission lines.

In a video conference system working on a packet communication, loss of some of picture data packets will cause drop frame of screen and loss of some of sound data packets will cause speech interruption making sound harsh.

To prevent drawback like that, a packet communication system has been proposed (Japanese Patent Application Laid-open, No. 2004-297265). The proposed system has routers on transmission lines for selection of a circuit from among plural transmission routes, wherein the routers select a transmission route according to the transmission delay time of packets.

SUMMARY OF INVENTION

For IP telephone systems, IP video conference systems, or other similar systems, in which sound data and picture data are transmitted (in the form of a packet communication) using network circuits as their transmission lines, it is not practicable to introduce such a system as selects transmission route by routers incorporated in the transmission lines according to the transmission delay time of packets like in the conventional packet transmission system, intending to prevent loss or transmission delay of some of sound data packets or picture data packets. This is because of that the introduction of such system requires modification of equipment to change function of the transmission line to be used. Therefore, such system is not applicable to a packet communication system that uses existing network circuits having transmission lines of which routers have no function for transmission route selection like mentioned above.

An object of the present invention is to prevent or reduce adverse effects that will be resulted from decline in communication data quality caused by the packet loss appeared in a packet communication that uses existing network circuits.

To be more precise, the object is to provide a packet communication method and equipment therefor that are capable of preventing or reducing drop frame of screen or speech interruption that makes sound harsh attributable to loss or transmission delay of some of sound data packets or picture data packets, even though existing transmission lines are used.

The present invention has features described below: If packet loss in a transmission line in a packet communication exceeds a predetermined value while such communication is on-going with a terminal equipment on the other end of the connection using one transmitter-receiver unit in the plurality of transmitter-receiver units in each of a plurality of units of terminal equipment that are connected each other through transmission lines, such packet communication is performed using another transmitter-receiver unit with the terminal equipment on the other end carrying the same data as in the above-stated packet communication. Following this, the sizes of the packet loss rates of two communication routes of the packet communication are compared to adopt the packet communication route of which packet loss rate is smaller than that of the other route in such comparison, for continuous communication and the packet communication on the route of which packet loss rate is larger is shut down.

To be more precise, the packet communication method of the present invention is a packet communication method in which information data is packetized by a packet assembly disassembly device (a PAD) in a first terminal equipment and information data packetized thereby is transmitted therefrom; the packet data transmitted are carried through transmission lines having a plurality of transmission routes; and a second terminal equipment depacketizes the packet data received from the transmission line with a PAD to reconstruct the original information data form, wherein the first terminal equipment and the second terminal equipment have a plurality of transmitter-receiver units; the packet communication is performed using one transmitter-receiver unit in such plurality of transmitter-receiver units; if packet loss of received data in such packet communication is detected exceeding a predetermined value, a request is sent using another transmitter-receiver unit to the first terminal equipment for transmitting the same data that above-stated one transmitter-receive unit is handling and the data transmitted at the request is received; packet loss of the data received using above-stated one transmitter-receiver unit and packet loss of the data received using above-stated another transmitter-receiver unit are compared to select a transmitter-receiver unit that is receiving data with smaller packet loss in such comparison, for continuous packet communication; and the other transmitter-receiver unit that is receiving data with larger packet loss is shut down.

The packet communication system of the present invention is comprised of a first terminal equipment having a PAD that performs packetization and depacketization of information data, a second terminal equipment having a PAD that performs packetization and depacketization of information data, and a transmission line having a plurality of transmission routes interconnecting above-stated two units of terminal equipment, wherein each of the first terminal equipment and the second terminal equipment has a plurality of transmitter-receiver units; a packet communication is performed using one transmitter-receiver unit in such plurality of transmitter-receiver units; if packet loss of received data in such packet communication is detected exceeding a predetermined value, a request is sent using another transmitter-receiver unit to the first terminal equipment for transmitting the same data that above-stated one transmitter-receive unit is handling and the data transmitted at the request is received; packet loss of the data received using above-stated one transmitter-receiver unit and packet loss of the data received using above-stated another transmitter-receiver unit are compared to select a transmitter-receiver unit that is receiving data with smaller packet loss in such comparison, for continuous packet communication; and the other transmitter-receiver unit that is receiving data with larger packet loss is shut down.

The terminal equipment of the present invention is a terminal equipment that has a PAD that performs packetization and depacketization of communication data, wherein the terminal equipment has a plurality of transmitter-receiver units; a first packet communication is performed using one transmitter-receiver unit in such plurality of transmitter-receiver units; if packet loss of the communication data in the first packet communication is detected exceeding a predetermined value, a second packet communication is performed using another transmitter-receiver unit to carry the same communication data that above-stated one transmitter-receiver unit is handling; packet loss of the data received using above-stated one transmitter-receiver unit and packet loss of the data received using above-stated another transmitter-receiver unit are compared to select a transmitter-receiver unit that is receiving data with smaller packet loss in such comparison, for continuous packet communication; and the other transmitter-receiver unit that is receiving data with larger packet loss is shut down.

The present invention realizes a packet communication method and equipment therefor that are capable of preventing or reducing drop frame of screen or speech interruption that makes sound harsh attributable to loss or delay of some of sound data packets or picture data packets, even though existing transmission lines are used.

MODE FOR IMPLEMENTING INVENTION

Figure 1:
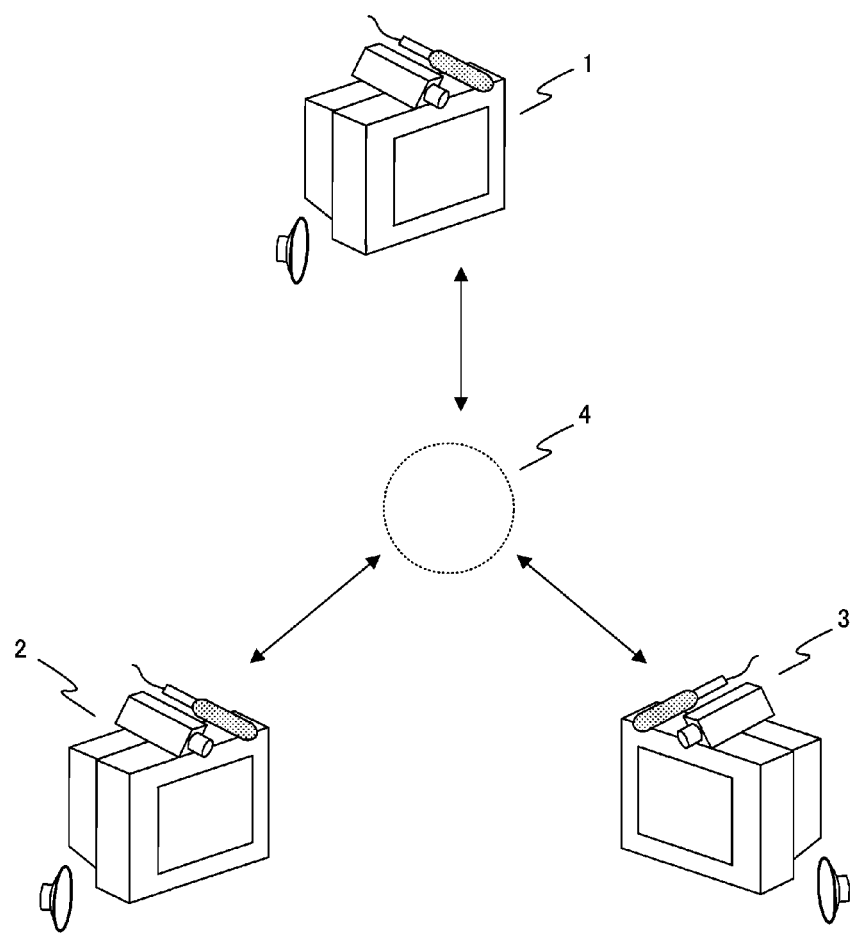
FIG. 1 This is a block diagram that illustrates an IP video conference system in which terminal equipment installed at three locations are interconnected through network circuits (transmission lines).

The packet communication method of the present invention is a packet communication method in which information data is packetized by a packet assembly disassembly device (a PAD) in a first terminal equipment and information data packetized thereby is transmitted therefrom; the packet data transmitted are carried through transmission lines having a plurality of transmission routes; and a second terminal equipment depacketizes the packet data received from the transmission line with a PAD to reconstruct the original information data form, wherein the first terminal equipment and the second terminal equipment have a plurality of transmitter-receiver units; the packet communication (a first packet communication) is performed using one transmitter-receiver unit in such plurality of transmitter-receiver units; if packet loss of received data in such packet communication is detected exceeding a predetermined value, a request is sent using another transmitter-receiver unit to the first terminal equipment for transmitting the same data that above-stated one transmitter-receive unit is handling and the data transmitted at the request is received (a second packet communication); packet loss of the data received using above-stated one transmitter-receiver unit and packet loss of the data received using above-stated another transmitter-receiver unit are compared to select a transmitter-receiver unit that is receiving data with smaller packet loss in such comparison, for continuous packet communication; and the other transmitter-receiver unit that is receiving data with larger packet loss is shut down.

The packet communication system of the present invention is comprised of a first terminal equipment having a PAD that performs packetization and depacketization of information data, a second terminal equipment having a PAD that performs packetization and depacketization of information data, and a transmission line having a plurality of transmission routes interconnecting above-stated two units of terminal equipment, wherein each of the first terminal equipment and the second terminal equipment has a plurality of transmitter-receiver units; a packet communication is performed using one transmitter-receiver unit in such plurality of transmitter-receiver units; if packet loss of received data in such packet communication is detected exceeding a predetermined value, a request is sent using another transmitter-receiver unit to the first terminal equipment for transmitting the same data that above-stated one transmitter-receive unit is handling and the data transmitted at the request is received; packet loss of the data received using above-stated one transmitter-receiver unit and packet loss of the data received using above-stated another transmitter-receiver unit are compared to select a transmitter-receiver unit that is receiving data with smaller packet loss in such comparison, for continuous the packet communication; and the other transmitter-receiver unit that is receiving data with larger packet loss is shut down.

The terminal equipment of the present invention is a terminal equipment that has a PAD that performs packetization and depacketization of communication data, wherein the terminal equipment has a plurality of transmitter-receiver units; a first packet communication is performed using one transmitter-receiver unit in such plurality of transmitter-receiver units; if packet loss of the communication data in the first packet communication is detected exceeding a predetermined value, a second packet communication is performed using another transmitter-receiver unit to carry the same communication data that above-stated one transmitter-receiver unit is handling; packet loss of the data received using above-stated one transmitter-receiver unit and packet loss of the data received using above-stated another transmitter-receiver unit are compared to select a transmitter-receiver unit that is receiving data with smaller packet loss in such comparison, for continuous packet communication; and the other transmitter-receiver unit as is receiving data with larger packet loss is shut down.

The present invention is applicable to the packet communication employed in IP telephone systems, IP video conference systems, or other similar systems, in which sound data and picture data are transmitted (in a form of packet communication) using network circuits (transmission lines). Here, an example applied to an IP video conference system is explained.

An IP video conference system has such construction that terminal equipment installed at plural locations which are remote each other are interconnected through network circuits to form a packet communication system on a half-duplex communication method and each terminal equipment transmits and receives (reconstructs) sound data and picture data.

FIG. 1 is a block diagram that illustrates an IP video conference system in which three units of terminal equipment 1, 2, and 3 installed severally at three locations are interconnected through network circuits (transmission lines) 4.

Figure 2:
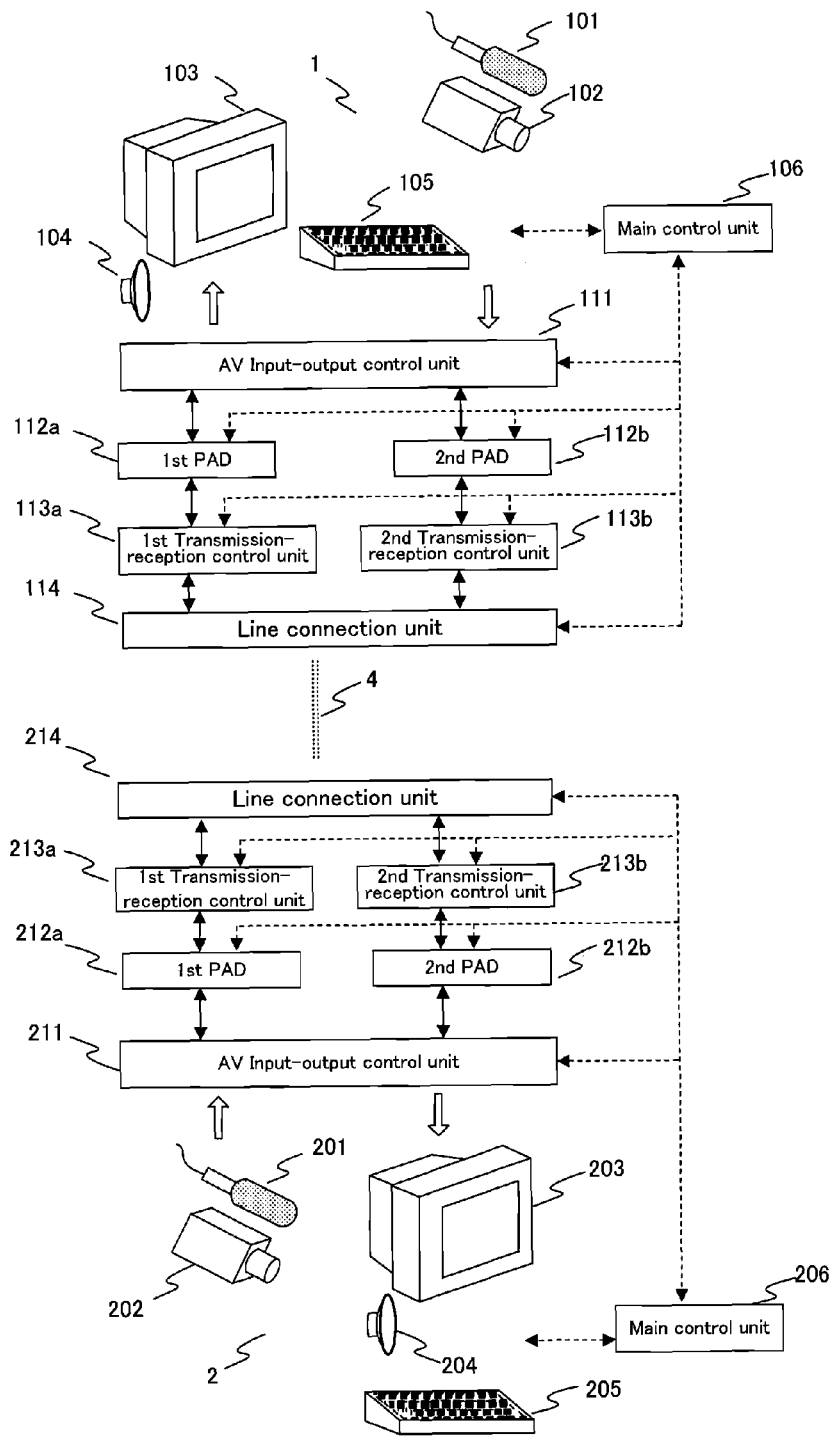
FIG. 2 This is a block diagram that illustrates functioning means in a packet communication system between a first terminal equipment and a second terminal equipment.

FIG. 2 is a block diagram that illustrates a packet communication system in which communication data (sound data and picture data) to be flowed between a first terminal equipment installed at a first location and a second terminal equipment installed at a second location are packetized and transmitted through a network circuit 4 in a form of packet communication. In an actual implementation, a third terminal equipment is installed at a third location and a similar packet communication system will be formed among the third terminal equipment and the other units of terminal equipment. Detailed description thereof is however omitted because the configuration of such packet communication system is the same as in the packet communication system provided between the first terminal equipment and the second terminal equipment.

Each of three units of terminal equipment 1, 2, and 3 is comprised of a computerized system having a functioning means for receiving sound information and picture information, transmitting sound data and picture data through the network circuit 4, and outputting sound data and picture data reconstructed from received data for replay.

The first terminal equipment 1 has a microphone 101 that produces sound data and an electronic camera 102 that produces picture data, both as an inputting means; and has a display 103 that reproduces picture data, a speaker 104 that replays sound data, and a keyboard 105 that enters commands.

A signal processing means in the first terminal equipment 1, which is comprised of memories (registers), a central processing unit (CPU), programs, and dedicated processing circuits, has processing function units as described below.

A main control unit 106 is a functioning means that controls the entire processing function units included in the terminal equipment following the command inputted from the keyboard 105 and has a packet analyzer function section, a packet loss rate analyzing section, and a control function section of transmission-reception control unit.

An audio-visual (AV) input-output control unit 111 performs functions of the acquiring of sound data for transmission outputted from the microphone 101 and picture data for transmission outputted from the electronic camera 102; the inputting of, based on acquired data, the same data of a first and a second sound data for transmission and picture data for transmission into both a first and a second PADs, which will be detailed later; and the supplying of sound data and a picture data for outputting to the speaker 104 and the display 103 selected from either of the first or the second sound data and picture data received on packet communication and reconstructed with the first and the second PADs, which will be detailed later.

A first PAD 112a performs functions that include the converting of the first sound data and picture data for transmission inputted from the AV input-output control unit 111 into a first packet data for transmission to output the converted data, and the reconstructing of the sound data and the picture data of original data form from a first incoming packet data received on packet communication.

A second PAD 112b performs functions that include the converting of the second sound data and picture data for transmission inputted from the AV input-output control unit 111 into a second packet data for transmission to output, and the reconstructing of the sound data and the picture data of original data form from a second incoming packet data received on packet communication.

A first transmission-reception control unit 113a and a second transmission-reception control unit 113b perform functions that include the controlling of transmission of the first and the second packet data for transmission produced at the PAD 112a and the PAD 112b, and the controlling of reception of incoming packet data.

A line connection unit 114 performs functions that include connecting with the network circuit 4, transmitting the packet data for transmission controlled by the first and the second transmission-reception control unit 113a and 113b to the network circuit 4, and receiving the incoming packet data from the network circuit 4.

In the first terminal equipment 1 thus configured, the first PAD 112a, the first transmission-reception control unit 113a, and the line connection unit 114 form a first transmission-reception system that carries communication through a first communication port (port number); and the second PAD 112b, the second transmission-reception control unit 113b, and the line connection unit 114 form a second transmission-reception system that carries communication through a second communication port (port number).

The second terminal equipment 2, which is configured in the same manner as the first terminal equipment 1, has a microphone 201 and an electronic camera 202, both as an inputting means; and has a display 203, a speaker 204, and a keyboard 105.

A signal processing means in the second terminal equipment 2 is comprised also of memories (registers), a central processing unit (CPU), and programs and has a main control unit 206, an AV input-output control unit 211, a first PAD 212a and a second PAD 212b, a first transmission-reception control unit 213a and a second transmission-reception control unit 213b, and a line connection unit 214.

Similarly, in the second terminal equipment 2 thus configured, the first PAD 212a, the first transmission-reception control unit 213a, and the line connection unit 214 form a first transmission-reception system that performs communication through a first communication port (port number); and the second PAD 212b, the second transmission-reception control unit 213b, and the line connection unit 214 form a second transmission-reception system that performs communication through a second communication port (port number).

In an actual implementation, the first terminal equipment 1 and the second terminal equipment 2 have more transmission-reception systems (communication ports) and such configuration permits simultaneous parallel communication involving another terminals.

This IP video conference system functions as described below when a video conference is in operation. Here, communication control processing is described about a case where the second terminal equipment 2 reconstructs data receiving sound data and picture data from the first terminal equipment 1. From the second terminal equipment 2 to the first terminal equipment 1, sound data and picture data are transmitted and reconstructed similarly to the above; detailed explanation for this is however omitted because each of the terminal equipment 1 and 2 functions similarly.

At the start, the first terminal equipment 1 and the second terminal equipment 2 are activated to make each functioning means ready for performing packet communication.

The main control unit 206 of the second terminal equipment 2 controls the first PAD 213a, the first transmission-reception control unit 213a, and the line connection unit 214, based on the command from the keyboard 205, in order that a request for the transmitting of data will be sent to the first terminal equipment 1 through the first communication port (IP address and port number).

The main control unit 106 in the first terminal equipment 1 controls the first PAD 112a, the first transmission-reception control unit 113a, and the line connection unit 114, in response to the request for transmitting data, in order that sound data and picture data outputted from the AV input-output control unit 111 will be converted into a first packet data for transmission to transmit such first packet data for transmission to the second terminal equipment 2 (a first packet communication) by outputting to the network circuit 4 through the first transmission-reception control unit 113a and the line connection unit 114 addressing to the first communication port (IP address and port number) of the second terminal equipment 2.

The main control unit 206 in the second terminal equipment 2 performs control processing that includes: the inputting of the first incoming packet data received from the network circuit 4 through the line connection unit 214 in the first PAD 212a from the first transmission-reception control unit 213a to reconstruct to the data of original data form; and the supplying of the reconstructed data to the speaker 204 and the display 203 as sound data and picture data through the AV input-output control unit 211 to replay.

In the second terminal equipment 2, while reception—reconstruction—replay of data in the first packet communication is under such state mentioned above, the main control unit 206 performs control processing of the detecting of packet loss using a packet analyzing function section therein to analyze packet loss rate using a packet loss rate analyzing section therein; and, if a control function section of transmission-reception control unit therein detects that packet loss rate has exceeded a predetermined value (such a value that forward error correction, or FEC, can recover but is within the permissible loss limit against sound quality deterioration, 20% for example), further performs the operating (activating) of the second PAD 212b and the second transmission-reception control unit 113b to send request, through the second communication port (IP address and port number), to the first terminal equipment 1 for transmitting data (activation of the second packet communication system).

The main control unit 106 in the first terminal equipment 1 controls the second PAD 112b in response to the request from the second PAD 212b for transmitting data in order that the sound data and picture data that are the same as those being transmitted by the first PAD 112a will be converted into the second packet data for transmission to transmit such second packet data for transmission to the network circuit 4 from the second transmission-reception control unit 113b through the line connection unit 114 addressing to the second communication port (IP address and port number) of the second terminal equipment 2.

The main control unit 206 in the second terminal equipment 2 performs communication backup control processing that includes: the inputting of the second incoming packet data received from the network circuit 4 through the line connection unit 214 in the second PAD 212b from the second transmission-reception control unit 213b to reconstruct to the data of original data form; and the supplying of the reconstructed data through the AV input-output control unit 211 to the speaker 204 and the display 203 as sound data and picture data to make replay available. (At this point of time, replay of data received through a first packet communication system continues.) The above-stated communication backup control processing further includes: the detecting of packet loss of such second incoming packet data using a packet analyzing function section therein; the analyzing of packet loss rate using a packet loss rate analyzing section therein; the comparing of sizes of packet loss rate of the first incoming packet data and packet loss rate of the second incoming packet loss rate using the control function section of transmission-reception control unit therein; the adopting of the received packet data of which packet loss rate is smaller than that of the other; and the switching of the transmitter-receiver unit in order that the adopted data will be supplied to the speaker 204 and the display 203 as sound data and picture data to replay.

Figure 3:
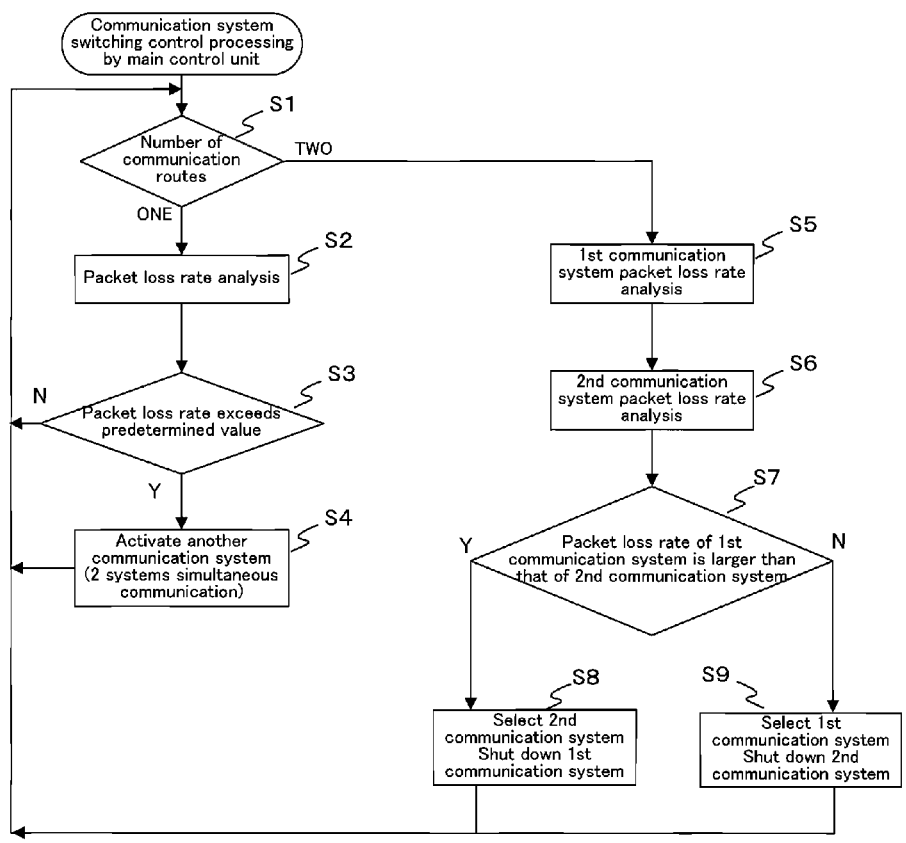
FIG. 3 This is a flowchart that illustrates the communication route switching control that a main control unit performs.

The control processing by the main control unit 206 for communication system switching will be explained referring to FIG. 3.

Step S1
Branch processing, counting number of active communication paths (packet communication systems).

Step S2
When number of active communication paths is one, analyze packet loss rate of incoming packet data under reception on active communication path (the first packet communication system).

Step S3
Branch processing, checking if analyzed packet loss rate is over predetermined value.

Step S4
When packet loss rate of active communication path (first packet communication system) reaches predetermined value, activate another communication path (second packet communication system) to bring two packet communication systems to a state in which simultaneous parallel communication is active.

Step S5
Where two packet communication systems are active for simultaneous parallel communication, analyze packet loss rate of first packet communication system first.

Step S6
Analyze packet loss rate of second packet communication system then.

Step S7
Branch processing according to result of size comparison of packet loss rates of first packet communication system and second packet communication system.

Step S8
When packet loss rate of first packet communication system is larger than that of second packet communication system, select second packet communication system to continue packet communication and shut down packet communication on first packet communication system.

Step S9
When packet loss rate of first packet communication system is not larger than that of second packet communication system, select first packet communication system to continue packet communication and shut down packet communication on second packet communication system.

In the network circuit 4, signals of the first packet communication and the second packet communication are carried through different signal transmission lines. In general, the signal transmission path for the second packet communication, which has been activated late, is to be assigned to such a transmission route as has less circuit congestion than the signal transmission path for the first packet communication.

Therefore, the control function section of transmission-reception control unit of the main control unit 206 in the second terminal equipment 2 performs the switching control processing of the controlling of the AV input-output control unit 211 (switching to the packet communication on the second packet communication system) in order that the sound data and the picture data received from the second transmission-reception control unit 213b and reconstructed with the second PAD 212b will be supplied to the speaker 204 and the display 203 to replay, when the packet loss rate of the second incoming packet data is judged smaller than that of the first incoming packet data; and the shutting down of the packet communication by the first PAD 212a and the first transmission-reception control unit 213a.

When, in contrast, the packet loss rate of the second incoming packet data is judged larger than that of the first incoming packet data in the loss rate size comparison, the control processing is performed for the continuing of the packet communication with the first incoming packet data and for shutting the packet communication by the second PAD 212b and the second transmission-reception control unit 213b.

After this, the first terminal equipment 1 and the second terminal equipment 2 continue packet communication on the second packet communication system; and monitoring, detection, and analysis of the packet loss rate are performed likewise. If the packet loss rate of the second packet communication system exceeds the predetermined value, the communication backup control processing is performed for the switching of present communication to the first packet communication system currently under being shut down.

As stated above, if the analyzing of packet loss rate of the first packet communication system indicates that the packet loss rate of the first packet communication system is exceeding the predetermined value, a simultaneous parallel communication is performed on the second packet communication system carrying the same transmission data as in the first packet communication system; and sizes of packet loss rates of the first packet communication and the second packet communication are compared to perform the switching of the system in order that the transmission data carried by the packet communication system of which packet loss rate is smaller will be reconstructed and replayed. Thereby, it becomes practicable to operate a packet communication system continuously with less adverse effect of the packet loss that is attributable to the circuit congestion in network circuits (transmission lines). Further, the performing of control processing for shutting down the packet communication system having larger packet loss rate than the other lightens the load (increase in the transmission quantity) on the network circuit.

The invention claimed is:

1. A packet communication method for a first terminal equipment and a second terminal equipment each having a plurality of transmitter-receiver systems and a plurality of packet assembly disassembly devices (PADs), comprising the steps of:
    packetizing information data by the PAD in the first terminal equipment and transmitting the packetized information data therefrom through transmission lines having a plurality of transmission routes;
    depacketizing the packetized information data received from the transmission lines with the PAD in the second terminal equipment to reconstruct original information data;
    performing a packet communication using one transmitter-receiver system in the plurality of transmitter-receiver systems;
    sending a request using another transmitter-receiver system in the plurality of transmitter-receiver systems to the first terminal equipment for transmitting the same data that the one transmitter-receiver system is handling, if packet loss of the received data in the packet communication exceeds a predetermined value;
    receiving the data retransmitted from the request;
    calculating the packet loss of the received data of the transmitter-receiver system;
    comparing the packet loss of the received data using the one transmitter-receiver system and the packet loss of the received data using the another transmitter-receiver system to select the transmitter-receiver system with smaller packet loss for continuous packet communication; and
    shutting down the transmitter-receiver system with larger packet loss,
    wherein the predetermined value is a value that is determined by a capability of forward error correction and is within a permissible loss limit against sound quality deterioration.

2. The packet communication method according to claim 1, wherein
    the permissible loss limit against sound quality deterioration is 20%.

3. A packet communication system, comprising:
    a first terminal equipment having a packet assembly disassembly device (PAD) that performs packetization and depacketization of information data;
    a second terminal equipment having the PAD that performs packetization and depacketization of the information data; and
    a transmission line having a plurality of transmission routes interconnecting the first terminal equipment and the second terminal equipment,
    wherein each of the first terminal equipment and the second terminal equipment has a plurality of transmitter-receiver systems,
    wherein a packet communication is performed using one transmitter-receiver system in the plurality of transmitter-receiver systems,
    wherein if packet loss of the received data in the packet communication exceeds a predetermined value, a request is sent using another transmitter-receiver system in the plurality of transmitter-receiver systems to the first terminal equipment for transmitting the same data that the one transmitter-receiver system is handling, and the data retransmitted from the request is received,
    if the number of the transmitter-receiver system is two, the packet loss of the received data using the one transmitter-receiver system and the packet loss of the received data using the another transmitter-receiver system are compared to select the transmitter-receiver system with smaller packet loss for continuous packet communication, and
    the transmitter-receiver system with larger packet loss is shut down, and
    wherein the predetermined value is a value that is determined by a capability of forward error correction and is within a permissible loss limit against sound quality deterioration.

4. The packet communication system according to claim 3, wherein
    the permissible loss limit against sound quality deterioration is 20%.

5. A terminal equipment, comprising:
    a packet assembly disassembly device (PAD) that performs packetization and depacketization of communication data; and
    a plurality of transmitter-receiver systems,
    wherein a first packet communication is performed using one transmitter-receiver system in the plurality of transmitter-receiver systems,
    wherein if packet loss of the communication data in the first packet communication exceeds a predetermined value, a second packet communication is performed using another transmitter-receiver system in the plurality of transmitter-receiver systems to receive the same communication data that the one transmitter-receiver system is handling,
    if the number of the transmitter-receiver system is two, the packet loss of the communication data using the one transmitter-receiver system and the packet loss of the communication data using the another transmitter-receiver system are compared to select the transmitter-receiver system with smaller packet loss for continuous packet communication, and the transmitter-receiver system with larger packet loss is shut down, and wherein the predetermined value is a value that is determined by a capability of forward error correction and is within a permissible loss limit against sound quality deterioration.

6. The terminal equipment according to claim 5, wherein the permissible loss limit against sound quality deterioration is 20%.

* * * * *